United States Patent
Ellis et al.

(10) Patent No.: US 9,079,585 B2
(45) Date of Patent: Jul. 14, 2015

(54) SYSTEM FOR AND METHOD OF MAINTAINING A DRIVER INTENDED PATH

(71) Applicant: Honda Motor Co., Ltd., Tokyo, Minato-ku (JP)

(72) Inventors: Nathaniel Ellis, Marysville, OH (US); Christopher J. Cymbal, Marysville, OH (US)

(73) Assignee: Honda Motor Co., Ltd., Tokyo (JP)

( * ) Notice: Subject to any disclaimer, the term of this patent is extended or adjusted under 35 U.S.C. 154(b) by 197 days.

(21) Appl. No.: 13/747,934

(22) Filed: Jan. 23, 2013

(65) Prior Publication Data

US 2014/0032070 A1      Jan. 30, 2014

Related U.S. Application Data

(62) Division of application No. 12/725,587, filed on Mar. 17, 2010, now Pat. No. 8,423,257.

(51) Int. Cl.

| | |
|---|---|
| *B60T 8/17* | (2006.01) |
| *B60W 30/10* | (2006.01) |
| *B60T 7/12* | (2006.01) |
| *B60T 8/1755* | (2006.01) |
| *B60T 8/24* | (2006.01) |
| *B62D 9/00* | (2006.01) |
| *B60W 10/06* | (2006.01) |

(Continued)

(52) U.S. Cl.
CPC  *B60W 30/10* (2013.01); *B60T 7/12* (2013.01); *B60T 8/17* (2013.01); *B60T 8/1755* (2013.01); *B60T 8/246* (2013.01); *B60W 10/06* (2013.01); *B60W 10/18* (2013.01); *B62D 9/005* (2013.01); *B60T 2260/02* (2013.01); *B60T 2270/402* (2013.01); *B60W 10/184* (2013.01); *B60W 30/18145* (2013.01); *B60W 2520/125* (2013.01); *B60W 2520/14* (2013.01); *B60W 2520/28* (2013.01); *B60W 2540/18* (2013.01)

(58) Field of Classification Search
CPC ....... B60T 2210/24; B60T 7/12; B60T 8/175; B60T 8/1755; B60T 8/17551; B60T 8/17552; B60T 8/17554; B60T 8/17555; B60T 8/17557; B60T 8/17558; B60T 8/176; B60T 8/1761; B60T 8/17613; B60T 8/17616; B60T 8/24; B60T 8/241; B60T 8/243; B60T 8/245; B60T 8/246; B60T 8/248; B60W 10/18; B60W 10/184; B60W 30/045; B60W 30/10
USPC ..................................................... 701/75, 83
See application file for complete search history.

(56) References Cited

U.S. PATENT DOCUMENTS

| | | |
|---|---|---|
| 4,573,545 A | 3/1986 | Kalns |
| 4,869,334 A | 9/1989 | Marumoto et al. |

(Continued)

FOREIGN PATENT DOCUMENTS

| | | |
|---|---|---|
| EP | 0421766 | 4/1991 |
| JP | 8067260 | 3/1996 |

(Continued)

*Primary Examiner* — Jerrah Edwards
(74) *Attorney, Agent, or Firm* — Plumsea Law Group, LLC

(57) ABSTRACT

A system and method of maintaining a vehicle on a driver intended path is disclosed. The method includes steps of detecting a failure in a power steering system and controlling a braking system to maintain the motor vehicle approximately on a driver intended path. The driver intended path can be a straight path or a curved path.

15 Claims, 7 Drawing Sheets

(51) Int. Cl.
*B60W 10/18* (2012.01)
*B60W 10/184* (2012.01)
*B60W 30/18* (2012.01)

(56) References Cited

U.S. PATENT DOCUMENTS

| | | |
|---|---|---|
| 5,039,926 A | 8/1991 | Morishita et al. |
| 5,696,681 A * | 12/1997 | Hrovat et al. ................... 701/70 |
| 5,999,870 A | 12/1999 | Tatsumi et al. |
| 6,018,691 A | 1/2000 | Yamamoto et al. |
| 6,134,491 A | 10/2000 | Kawagoe et al. |
| 6,439,336 B2 | 8/2002 | Noro et al. |
| 6,588,541 B2 | 7/2003 | Norman et al. |
| 6,745,866 B2 | 6/2004 | Norman et al. |
| 7,142,969 B2 | 11/2006 | Inagaki |
| 7,474,071 B2 | 1/2009 | Koeppl et al. |
| 7,516,003 B2 | 4/2009 | Maeda et al. |
| 2002/0189889 A1 | 12/2002 | Demerly |
| 2005/0121976 A1* | 6/2005 | O'Dea ......................... 303/146 |
| 2005/0240332 A1* | 10/2005 | Mori et al. ...................... 701/72 |
| 2007/0176488 A1 | 8/2007 | Miyajima et al. |
| 2007/0179697 A1 | 8/2007 | Holler |
| 2008/0097671 A1 | 4/2008 | Kojo et al. |
| 2008/0294313 A1 | 11/2008 | Aoki et al. |
| 2009/0026994 A1 | 1/2009 | Namuduri et al. |
| 2009/0093931 A1 | 4/2009 | Mizutani et al. |
| 2011/0231052 A1 | 9/2011 | Ellis et al. |

FOREIGN PATENT DOCUMENTS

| | | |
|---|---|---|
| JP | 11208492 | 8/1999 |
| JP | 2001071920 | 3/2001 |
| JP | 2003170857 | 6/2003 |
| JP | 2003312507 | 11/2003 |
| JP | 2004122943 | 4/2004 |
| JP | 2004168128 | 6/2004 |
| JP | 2005112123 | 4/2005 |
| JP | 2005153709 | 6/2005 |
| JP | 2005193834 | 7/2005 |
| JP | 2005219573 | 8/2005 |
| JP | 2005271860 | 10/2005 |
| JP | 2006027511 | 2/2006 |
| JP | 2006027512 | 2/2006 |
| JP | 2006069352 | 3/2006 |
| JP | 2006142960 | 6/2006 |
| JP | 2008132919 | 6/2008 |
| JP | 2008260403 | 10/2008 |

* cited by examiner

SYSTEM FOR AND METHOD OF MAINTAINING A DRIVER INTENDED PATH

CROSS REFERENCE TO RELATED APPLICATION

This application is a division of U.S. patent application Ser. No. 12/725,587, entitled "System For And Method Of Maintaining A Driver Intended Path", filed on Mar. 17, 2010, which application is incorporated herein by reference in its entirety.

BACKGROUND

The present invention relates generally to a motor vehicle, and in particular to a system and method for maintaining a driver intended path.

Methods of assisting a driver in controlling a motor vehicle have been previously proposed. Power steering systems are known to provide steering assistance to a driver to help reduce the effort required by a driver to turn a vehicle. In addition, stability systems are known that help improve safety by detecting and minimizing skids. The related art lacks provisions for helping to control a vehicle during the failure of one or more assistance systems.

SUMMARY

In one aspect, the invention provides a method of operating a motor vehicle during a power steering system failure, comprising the steps of: receiving yaw rate information from a yaw rate sensor; receiving lateral G information from an acceleration sensor; receiving steering angle information from a steering angle sensor; receiving wheel speed information from a set of wheel speed sensors; calculating a driver intended path for the motor vehicle for use immediately following a power steering system failure; determining a required braking pressure for at least one wheel of the motor vehicle required to move the motor vehicle approximately along the driver intended path; and controlling at least one brake of the motor vehicle using the required braking pressure.

In another aspect, the invention provides a method of operating a motor vehicle, comprising the steps of: receiving information related to a failure of a power steering system; receiving information from a plurality of sensors related to an operating condition of the motor vehicle; calculating a driver intended path for the motor vehicle; operating an electronic stability control system to maintain the motor vehicle near the driver intended path for a predetermined time; and stopping the operation of the electronic stability control system after the predetermined time has passed.

In another aspect, the invention provides a method of operating a motor vehicle, comprising the steps of: receiving vehicle operating conditions; determining a driver intended path for the motor vehicle; calculating a current deviation from the driver intended path associated with a current trajectory of the motor vehicle; retrieving a threshold deviation; comparing the current deviation with the threshold deviation; and controlling at least one brake of the motor vehicle to maintain the motor vehicle near the driver intended path when the current deviation is substantially greater than the threshold deviation.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
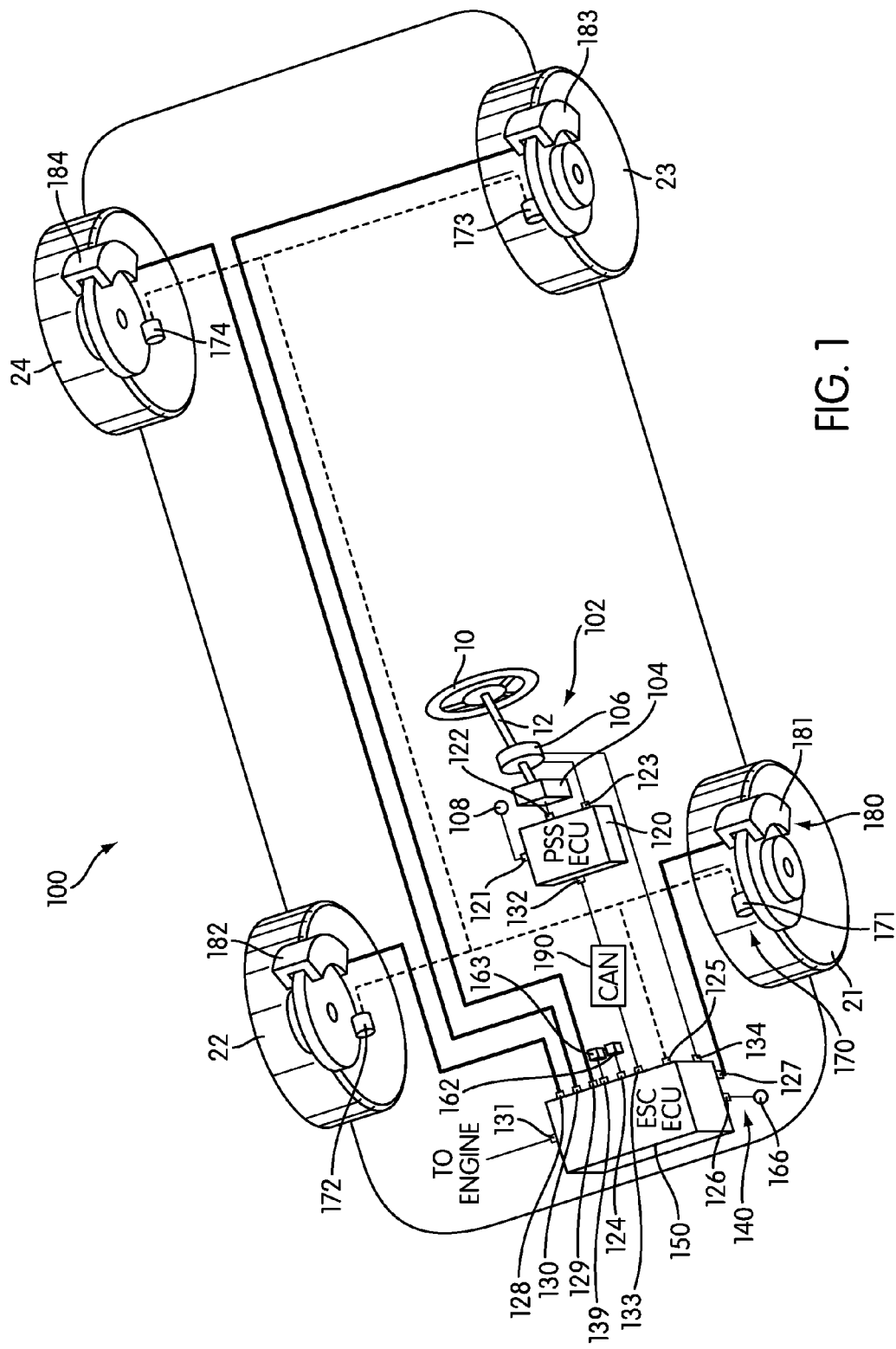
FIG. 1 is a schematic view of an embodiment of a motor vehicle including a power steering system and an electronic stability control system.

FIG. 1 is a schematic view of a motor vehicle 100 according to a first embodiment of the invention. The term "motor vehicle" as used throughout the specification and claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

In some cases, the motor vehicle includes one or more engines. The term "engine" as used throughout the specification and claims refers to any device or machine that is capable of converting energy. In some cases, potential energy is converted to kinetic energy. For example, energy conversion can include a situation where the chemical potential energy of a fuel or fuel cell is converted into rotational kinetic energy or where electrical potential energy is converted into rotational kinetic energy. Engines can also include provisions for converting kinetic energy into potential energy. For example, some engines include regenerative braking systems where kinetic energy from a drive train is converted into potential energy. Engines can also include devices that convert solar or nuclear energy into another form of energy. Some examples of engines include, but are not limited to: internal combustion engines, electric motors, solar energy converters, turbines, nuclear power plants, and hybrid systems that combine two or more different types of energy conversion processes.

For purposes of illustration, some components of motor vehicle 100 are shown schematically in this embodiment. In one embodiment, motor vehicle 100 can include steering wheel 10 that is further connected to steering shaft 12. Steering shaft 12 can be connected to a steering rack, which may be further connected to the front wheels of motor vehicle 100 using tie rods.

Motor vehicle 100 can include power steering system 102. Power steering system 102 can be any system designed to reduce the steering effort used by a driver to turn or steer a motor vehicle. In some cases, power steering system 102 may be a hydraulic type power steering system. In other cases, power steering system 102 may be an electric power steering system. In an exemplary embodiment, power steering system 102 may be an electric power steering system that uses an electric motor to provide assistance in turning or steering a motor vehicle. Examples of different types of power steering systems can be found in U.S. Pat. No. 7,188,702, to Takagi and U.S. Pat. No. 7,155,327, to Hamamoto et al., both of which are hereby incorporated by reference.

Power steering system 102 may include provisions for assisting a driver in turning a motor vehicle. In one embodiment, power steering system 102 can include motor 104. Generally, motor 104 can be any type of motor. In an exemplary embodiment, motor 104 can be an electric motor that is configured to drive one or more components of a motor vehicle to assist in turning the motor vehicle. For example, in a rack-and-pinion type steering system, motor 104 may be installed concentrically around the rack to provide assistance in pushing the rack to the left or to the right. In other embodiments using different types of steering systems, motor 104 can be provided in various locations to provide assistance in turning the motor vehicle.

Power steering system 102 can include provisions for monitoring the rotation of steering shaft 12. In some cases, power steering system 102 can include a position sensor that is configured to monitor the absolute position of steering shaft 12. In other cases, power steering system 102 can include a rotation sensor of some kind that is configured to directly monitor the rotation of steering shaft 12. In embodiments using an electric motor to help assist with turning, power steering system 102 can include a sensor configured to measure the angular rotation of the motor. For example, in one embodiment, a plurality of hall sensors can be associated with motor 104 to measure movements of a rotor. In another embodiment, a resolver type sensor can be used for detecting the rotations of a rotor within motor 104. Since the rotation of a motor in a power steering system is typically related to the rotation of a steering shaft by a fixed gear ratio, a measurement of the rotation of the motor can be related directly to a measurement of the rotation of the steering shaft. In still other embodiments, the rotation of steering shaft 12 can be detected in any other manner. In the exemplary embodiment, power steering system 102 may include steering angle sensor 106.

Power steering system 102 can also include provisions for detecting torque applied by a driver to a steering system. In one embodiment, power steering system 102 can include steering torque sensor 108. In some cases, steering torque sensor 108 can be associated with a gearbox of the steering system. In other cases, however, steering torque sensor 108 can be provided at any other location of a steering system. Using this arrangement, a power steering system can determine the amount of steering assistance that may be required.

It will be understood that some of the provisions for power steering system 102 included in the current embodiment may be optional in other embodiments. Furthermore, in some embodiments, power steering system 102 can include additional components or provisions not shown here. It will also be understood that the arrangement of motor 104, steering angle sensor 106 and torque sensor 108 is schematically shown for purposes of clarity. In other embodiments, motor 104, steering angle sensor 106 and steering torque sensor 108 could be arranged in any other manner.

Motor vehicle 100 may include provisions for communicating, and in some cases controlling, the various components associated with power steering system 102. In some embodiments, motor vehicle 100 may be associated with a computer or similar device. In the current embodiment, motor vehicle 100 may be associated with a power steering system electronic control unit, hereby referred to as first ECU 120. In one embodiment, first ECU 120 may be configured to communicate with, and/or control, motor 104, steering angle sensor 106 and steering torque sensor 108 as well as other components or systems.

First ECU 120 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

All of the following ports and provisions associated with first ECU 120 are optional. Some embodiments may include a given port or provision, while others may exclude it. The following description discloses many of the possible ports and provisions that can be used, however, it should be kept in mind that not every port or provision must be used or included in a given embodiment.

In one embodiment, first ECU 120 can include port 121 for communicating with steering torque sensor 108, port 122 for communicating with motor 104 and port 123 for communicating with steering angle sensor 106. In particular, using port 121, first ECU 120 can receive information from steering torque sensor 108 related to the torque applied to steering shaft 12. With this information, first ECU 120 can determine how much steering assistance is required and send a control signal to motor 104, using port 122 to operate motor 104 in a manner that provides the required steering assistance. In addition, first ECU 120 may receive information from steering angle sensor 106 via port 123 about the rotation of steering shaft 12.

Motor vehicle 100 can include provisions for providing increased stability assistance during driving. In an exemplary embodiment, motor vehicle 100 can include electronic stability control system 140, also referred to as ESC 140. Electronic stability control system 140 can be any electric stability control system that is capable of modifying the operation of a vehicle by detecting and preventing undesirable motions such as skidding. In particular, electronic stability control system 140 may be configured to detect loss of steering control and provide individual braking at different wheels to help redirect a vehicle. In addition, in some embodiments, electronic stability control system 140 may be configured to perform additional functions as discussed in detail below.

Electronic stability control system 140 can be associated with one or more sensors configured to receive information related to operating conditions of motor vehicle 100. In some embodiments, motor vehicle 100 can include acceleration sensor 162. Generally, acceleration sensor 162 can be any type of acceleration sensor. In one embodiment, acceleration sensor 162 can be configured to receive lateral G acceleration information. In addition, in some embodiments, motor vehicle 100 can include yaw rate sensor 163 that is configured to receive yaw rate information. In one embodiment, yaw rate sensor 163 may be a gyroscopic sensor that is configured to detect yaw rate information. In some cases, yaw rate sensor 163 may be a piezoelectric sensor. Although two sensors are used for determining yaw rate information and lateral G information in the current embodiment, in other embodiments, a single sensor could be used for determining both yaw rate information and lateral G information.

In one embodiment, motor vehicle 100 can include set of wheel speed sensors 170. In some cases, set of wheel speed sensors 170 may comprise a set of four independent wheel speed sensors associated with the four wheels of motor vehicle 100. In particular, each wheel speed sensor of set of wheel speed sensors 170 may be configured to detect the speed of a corresponding wheel of motor vehicle 100. In the current embodiment, set of wheel speed sensors 170 comprises first wheel speed sensor 171, second wheel speed sensor 172, third wheel speed sensor 173 and fourth wheel speed sensor 174, associated with first wheel 21, second wheel 22, third wheel 23 and fourth wheel 24, respectively, of motor vehicle 100.

Using this information, electronic stability control system 140 may detect variations in wheel speed over each of the four wheels of motor vehicle 100 for detecting slipping, skidding, or other undesirable vehicle motions. Furthermore, while four wheel speed sensors may be used in an exemplary embodiment, other embodiments can include any other number of wheel speed sensors. In an alternative embodiment including a vehicle with more than four wheels, for example, more than four wheel speed sensors may be provided on the motor vehicle.

In some embodiments, motor vehicle 100 can include vehicle speed sensor 166. In some cases, vehicle speed sensor 166 can be a vehicle speed pulse sensor associated with a transmission of motor vehicle 100. In other cases, vehicle speed sensor 166 can be any other type of sensor configured to provide vehicle speed information to one or more systems of motor vehicle 100. By monitoring information received from vehicle speed sensor 166, electronic stability control system 140 may be configured to detect unwanted operating conditions in a motor vehicle.

Motor vehicle 100 may include provisions for communicating, and in some cases controlling, the various components associated with vehicle steering assist system 140. In some embodiments, motor vehicle 100 may be associated with a computer or similar device. In the current embodiment, motor vehicle 100 may be associated with an electronic stability control system electronic control unit, hereby referred to as second ECU 150. In one embodiment, second ECU 150 may be configured to communicate with, and/or control various sensors and systems of motor vehicle 100 that are utilized in operating electronic stability control system 140.

Second ECU 150 may include a number of ports that facilitate the input and output of information and power. The term "port" as used throughout this detailed description and in the claims refers to any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In one embodiment, second ECU 150 can include port 124 for communicating with acceleration sensor 162. In some cases, second ECU 150 may be configured to receive lateral G information related to motor vehicle 100 from acceleration sensor 162. Second ECU 150 can also include port 139 for receiving yaw rate information. In some cases, second ECU 150 may be configured to receive yaw rate information from yaw rate sensor 163.

Also, second ECU 150 can include port 125 for communicating with set of wheel speed sensors 170. In particular, second ECU 150 can be configured to receive information about the speeds of one or more wheels of motor vehicle 100. Also, second ECU 150 can include port 126 for communicating with vehicle speed sensor 166. In particular, second ECU 150 can be configured to receive vehicle speed pulse information associated with a transmission of motor vehicle 100. With this arrangement, second ECU 150 may be configured to determine various operating conditions of motor vehicle 100 to determine if motor vehicle 100 is skidding or sliding. Although the current embodiment only includes a single port for receiving information from multiple wheel speed sensors, in other embodiments second ECU 150 could include a separate port for receiving information from each individual wheel speed sensor.

Electronic stability control system 140 can also include provisions for controlling one or more systems of a motor vehicle in order to provide stability control. In some embodiments, electronic stability control system 140 can include provisions for communicating with braking system 180. In this case, braking system 180 may comprise first brake 181, second brake 182, third brake 183 and fourth brake 184 associated with first wheel 21, second wheel 22, third wheel 23 and fourth wheel 24, respectively. In some embodiments, second ECU 150 can include port 127, port 128, port 129 and port 130 for communicating with first brake 181, second brake 182, third brake 183 and fourth brake 184, respectively. For example, in some cases, upon detecting a skidding condition of a motor vehicle, second ECU 150 may send control signals to braking system 180 to apply individual braking to the wheels of motor vehicle 100 in order to stabilize the driving conditions and reduce skidding.

Electronic stability control system 140 can be associated with additional systems of a motor vehicle for assisting in controlling a motor vehicle during skidding or other undesired operating conditions. In the current embodiment, electronic stability control system 140 can be configured to control an engine. For example, electronic stability control system 140 could be configured to control an engine in a manner that reduces power during situations where steering control is lost. In an exemplary embodiment, second ECU 150 may include port 131 for communicating with an engine (not shown) of motor vehicle 100.

Motor vehicle 100 can include provisions for providing communication between various systems. In one embodiment, motor vehicle 100 can include provisions for providing communication between power steering system 102 and electronic stability control system 140. In some cases, motor vehicle 100 can include vehicle controller area network 190. In some cases, vehicle controller area network 190 may provide communication between any systems of a motor vehicle utilizing some type of electronic control unit. In an exemplary embodiment, vehicle controller area network 190 is configured to provide communication between power steering system 102 and electronic stability control system 140. In particular, first ECU 120 of power steering system 102 may communicate with vehicle controller area network 190 using port 132, while second ECU 150 of electronic stability control system 140 may communicate with vehicle controller area network 190 using port 133. Although the current embodiment uses a controller area network to provide communication between power steering system 102 and electronic stability control system 140, in other embodiments communication can be established between power steering system 102 and electronic control system 140 using any other provisions. In another embodiment, for example, first ECU 120 of power steering system 102 could communicate directly with second ECU 150 of electronic stability assist system 140. In still other embodiments, power steering system 102 and electronic control system 140 could be configured to communicate using any known networks or other systems that are known in the art.

In addition, in some cases, second ECU 150 may be configured to receive information from steering angle sensor 106. In some cases, second ECU 150 may receive information related to steering angle sensor 106 through vehicle controller area network 190. In an exemplary embodiment, second ECU 150 may include port 134 for receiving information from steering angle sensor 106 directly.

A motor vehicle can include provisions for assisting a driver in steering a vehicle during periods when a power steering system fails. In some embodiments, an electronic stability control system can control a motor vehicle immediately following a power steering system failure in order to maintain the vehicle along a predetermined path or trajectory. This may provide time for a driver to adapt to a situation in which no power steering assistance is provided following a sudden failure of the power steering system.

In an exemplary embodiment, electronic stability control system 140 may be configured to control motor vehicle 100 immediately following a failure of power steering system 102. In particular, electronic stability control system 140 may provide individual braking to first wheel 21, second wheel 22, third wheel 23 and fourth wheel 24 in order to maintain motor vehicle 100 on a predetermined path or trajectory. In addition, in some cases, electronic stability control system 140 may provide torque reduction by an engine in order to help maintain motor vehicle 100 on a predetermined path or trajectory.

Figure 2:
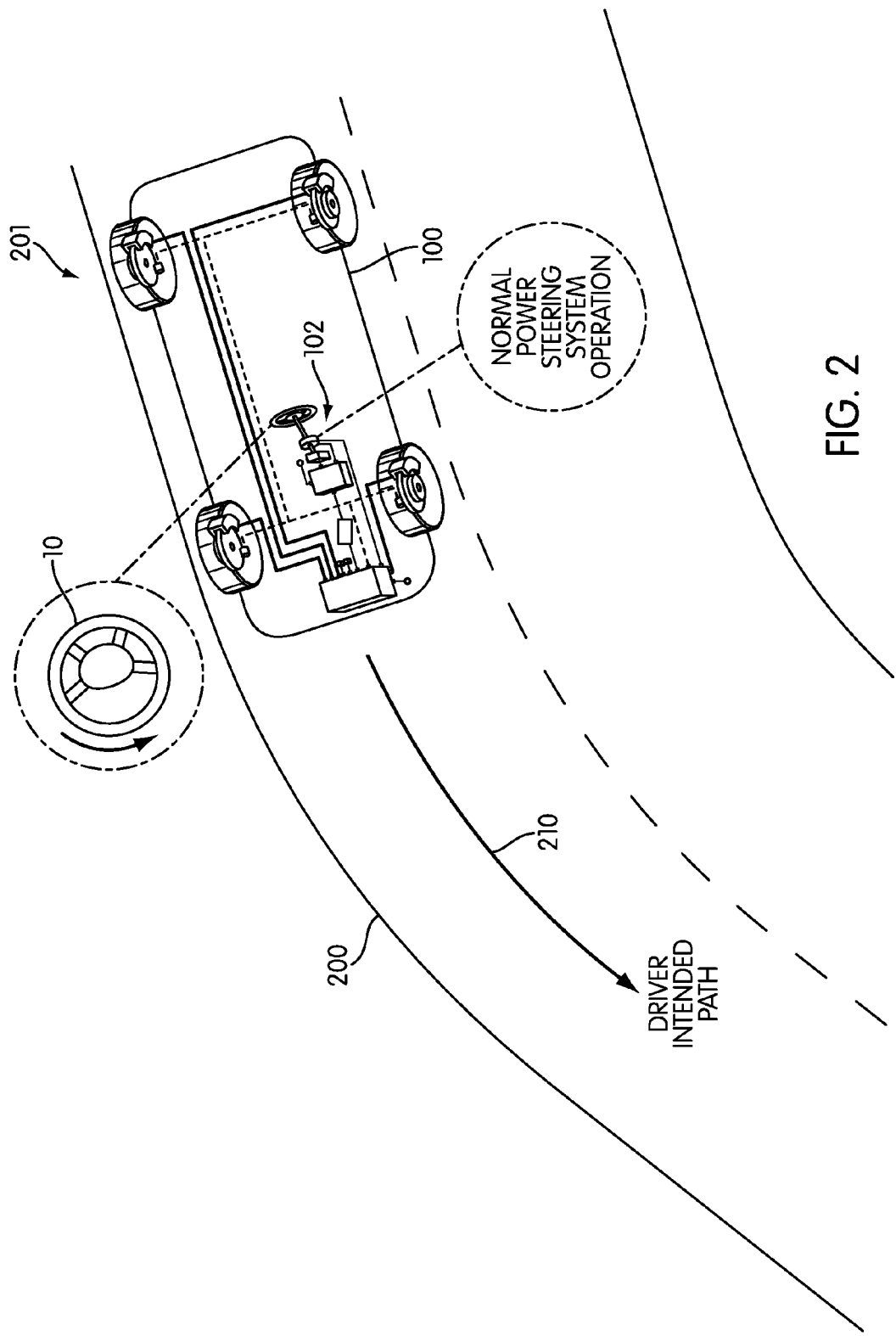
FIG. 2 is a schematic view of an embodiment of a motor vehicle traveling on a curved roadway segment.
Figure 3:
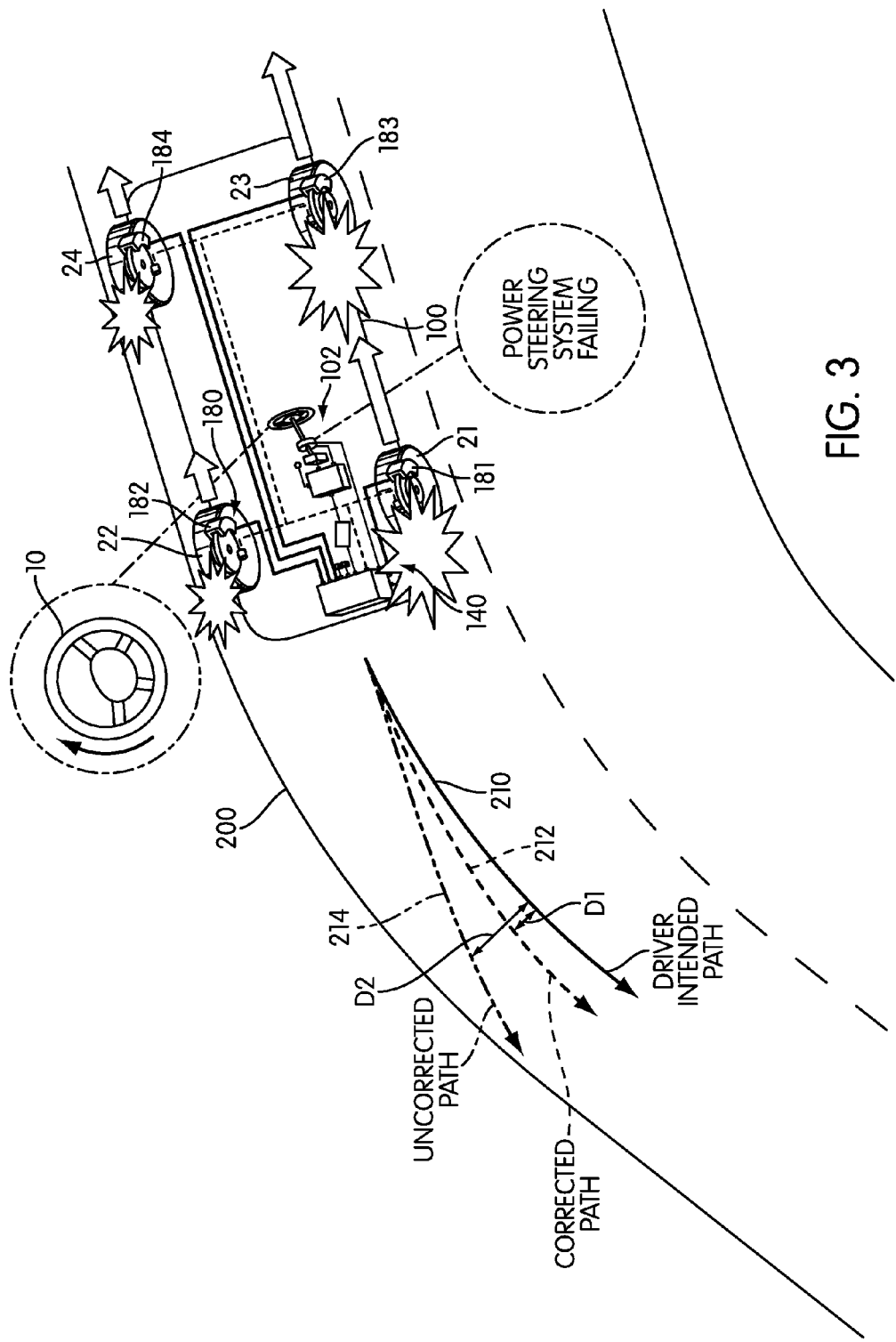
FIG. 3 is a schematic view of an embodiment of a motor vehicle traveling on a curved roadway segment during a power steering system failure.

FIGS. 2 and 3 illustrate embodiments of the operation of electronic stability control system 140 immediately following a failure of power steering system 102. Referring to FIG. 2, initially motor vehicle 100 is traveling on curved roadway segment 200. In this case, curved roadway segment 200 represents a turn or corner in roadway 201. Furthermore, steering wheel 10 is rotated counterclockwise as a driver turns motor vehicle 100 around curved roadway segment 200. At this point, power steering system 102 is operating normally to assist the driver in steering motor vehicle 100. With this arrangement, motor vehicle 100 can be easily directed along driver intended path 210, which closely matches the contour of curved roadway segment 200. The term "driver intended path" as used throughout this detailed description and in the claims refers to the path or trajectory that a driver intends to transverse. A driver intended path may have any shape. In some cases, a driver intended path could be a substantially straight path. In other cases, a driver intended path could be a substantially curved path.

Referring now to FIG. 3, power steering system 102 has failed as motor vehicle 100 continues traveling on curved roadway segment 200. Without power steering assistance, steering wheel 10 may rotate suddenly in a clockwise direction before a driver has a chance to respond and apply a significantly greater amount of torque to keep steering wheel 10 turned in the desired direction. However, to avoid a sudden deviation from driver intended path 210, electronic stability control system 140 may automatically activate braking system 180 to steer motor vehicle 100 in the general direction of driver intended path 210. In particular, in the current embodiment, first brake 181, second brake 182, third brake 183 and fourth brake 184 may all be activated. Moreover, the larger braking forces are applied at first brake 181 and/or third brake 183, while substantially smaller braking forces are applied to second brake 182 and/or fourth brake 184. This arrangement of braking forces may cause motor vehicle 100 to pivot slightly, creating an inward moment that further acts to turn motor vehicle 100 along the direction of driver intended path 210.

Corrected path 212 indicates the actual path traversed by motor vehicle 100 due to the operation of electronic stability control system 140. It can clearly be seen that corrected path 212 approximately coincides with driver intended path 210. Furthermore, corrected path 212 is substantially closer to driver intended path 210 than uncorrected path 214, which indicates the path that would be traversed by motor vehicle 100 without any action by electronic stability control system 140.

For purposes of comparing corrected path 212 and uncorrected path 214, each path can be associated with an average path deviation. The term "average path deviation" as used throughout this detailed description and in the claims refers to the average distance between any two adjacent points of two paths. For example, average path deviation D1 represents the average distance between any two adjacent points on corrected path 212 and driver intended path 210. Similarly, average path deviation D2 represents the average distance between any two adjacent points on uncorrected path 214 and driver intended path 210. For purposes of clarity average path deviation D1 and average path deviation D2 are illustrated schematically in FIG. 3 as distances between specific adjacent locations of driver intended path 210, corrected path 212 and uncorrected path 214. However, it will be understood that these deviations are intended to characterize the average distance between adjacent paths, rather than the distance between adjacent paths at a particular location.

Figure 4:
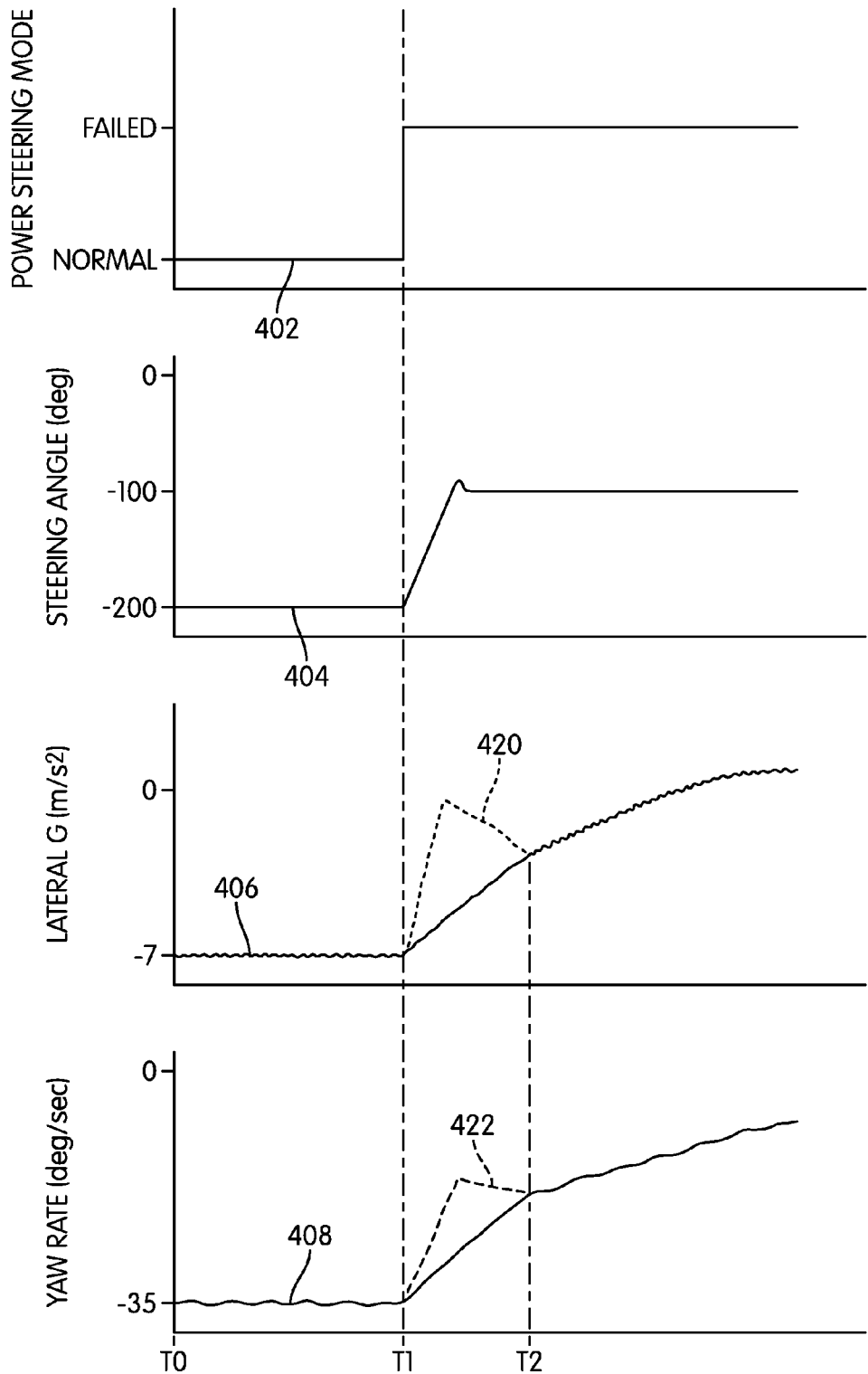
FIG. 4 is an embodiment of various operating parameters of a motor vehicle over time.

FIG. 4 illustrates an embodiment of various operating parameters of motor vehicle 100 over time. It will be understood that the values for the operating parameters shown here are only intended to be exemplary. The operating parameters can take on any other values in different embodiments. Referring to FIG. 4, between time T0 and time T1, power steering system 102 may operate normally, as indicated by power steering mode 402. During this time, a driver may maintain steering wheel 10 in a rotated position so that steering angle 404 is approximately −200 degrees. Furthermore, during this period, lateral G acceleration 406 and yaw rate 408 may remain approximately constant as motor vehicle 100 travels along a curve.

At time T1, power steering system 102 may fail. The failure could be caused by any number of factors, including problems with steering torque sensor 108 and/or motor 104. This sudden failure in power steering assistance may cause steering angle 404 to change rapidly under a sudden change in torque. Furthermore, a driver may have a difficult time counteracting the sudden change in torque on the steering system due to the failure of power steering system 102.

Without any intervention by electronic stability control system 140, as steering angle 404 changes rapidly, motor vehicle 100 may veer away from the driver intended path causing sudden changes in lateral G acceleration 406 and yaw rate 408. In particular, without assistance from electronic stability control system 140, lateral G acceleration 406 would undergo first sudden transition 420 while yaw rate 408 would undergo second sudden transition 422 immediately following time T1.

However, using electronic stability control system 140 to modify the path of motor vehicle 100, the sudden changes of lateral G acceleration 406 and yaw rate 408 may be smoothed out to provide the driver with a more comfortable transition and maintain motor vehicle 100 on or near the driver intended path. In this case, lateral G acceleration 406 and yaw rate 408 are changed more smoothly between time T1 and time T2 as electronic stability control system 140 controls motor vehicle 100 along a corrected path that is closer to the driver intended path. In particular, the rates of change of lateral G acceleration 406 and yaw rate 408 between time T1 and time T2 are significantly reduced using electronic stability control system 140 to modify the path traversed by motor vehicle 100.

Figure 5:
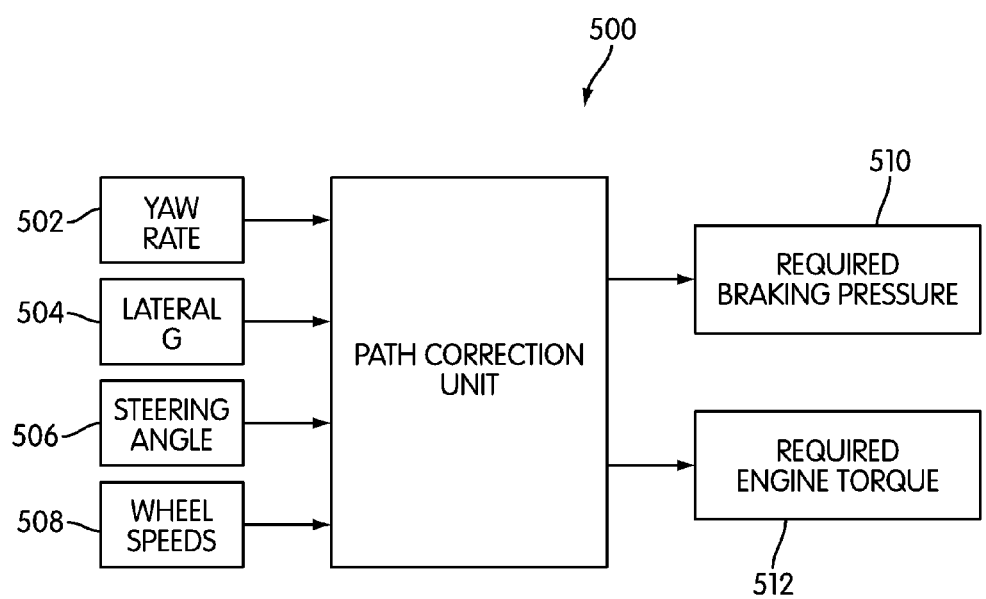
FIG. 5 is a schematic embodiment of a path correction unit.

FIG. 5 illustrates a schematic embodiment of path correction unit 500. In some cases, path correction unit 500 can be associated with second ECU 150. In other cases, path correction unit 500 can be associated with any other components of motor vehicle 100. Furthermore, path correction unit 500 may comprise any algorithms or programs.

Path correction unit 500 may receive any inputs from one or more components of motor vehicle 100. In an exemplary embodiment, path correction unit 500 may receive as inputs yaw rate 502, lateral G acceleration 504, steering angle 506 and wheel speeds 508. In some cases yaw rate 502 and lateral G acceleration 504 may be received from yaw rate sensor 163 and acceleration sensor 162, respectively. Additionally, steering angle 506 can be received from steering angle sensor 106. Also, wheel speeds 508 can be received from set of wheel speed sensors 170.

As an output, path correction unit 500 provides required braking pressure 510. Required braking pressure 510 may be information used by electronic stability control system 140 to control one or more brakes of braking system 180. In some embodiments, path correction unit 500 may also provide required engine torque 512 as an output. Required engine torque 512 may be information used by electronic stability control system 140 to control the torque of the engine.

In order to determine the required braking pressure and/or engine torque needed to control motor vehicle 100 on a corrected path, path correction unit 500 may be capable of calculating a driver intended path. As discussed above, the driver intended path may be the path intended by the driver prior to the failure of the power steering system. In addition, in some cases, path correction unit 500 may also calculate an uncorrected path or current path that corresponds to the current trajectory of the motor vehicle. In many cases, the uncorrected path may deviate greatly from the driver intended path due to loss of control during the time immediately following the failure of the power steering system. In some cases, the driver intended path could be determined using stored yaw rate information, lateral G information, steering angle information as well as wheel speed information that were measured prior to the failure of the power steering system. In addition, in some embodiments, the driver intended path could be estimated by assuming a constant yaw rate or a yaw rate with a low rate of change that best matches the measured yaw rate change prior to the failure of the power steering system. Additionally, the uncorrected path could be determined using current values of yaw rate, lateral G acceleration, wheel speeds and/or steering angle. However, in other cases both the driver intended path and the uncorrected path could be determined using any combination of stored and current values of any vehicle operating parameters. It will be understood that in other embodiments, any other methods of determining a driver intended path and an uncorrected path could be used.

Figure 6:
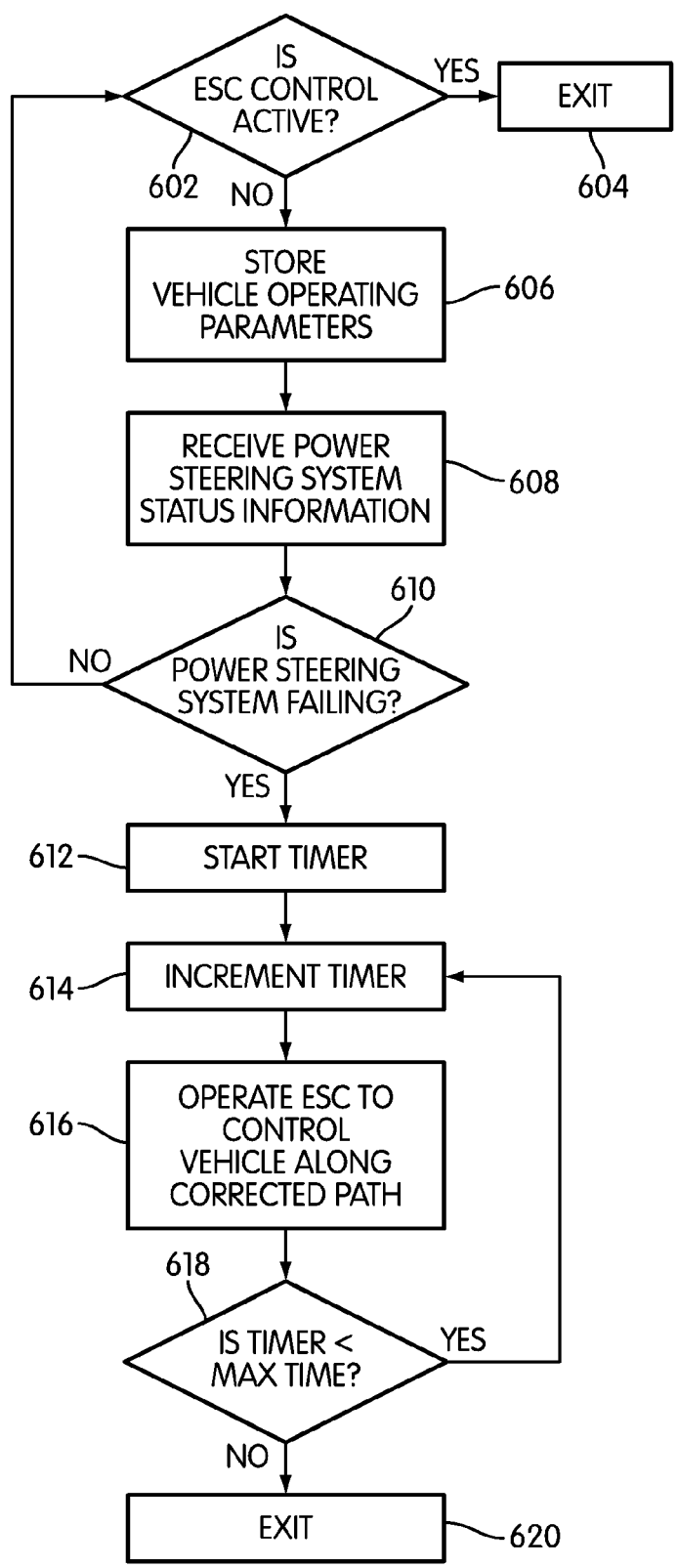
FIG. 6 is an embodiment of a process for controlling a motor vehicle during a power steering system failure.

FIG. 6 illustrates an embodiment of a method of controlling a motor vehicle. In some embodiments, some of the following steps could be accomplished by electronic stability control system 140. Specifically, in some cases, some of the following steps could be accomplished by second ECU 150 of electronic stability control system 140. In other embodiments, some of the following steps could be accomplished by other components of motor vehicle 100. It will be understood that in other embodiments one or more of the following steps may be optional.

During step 602, second ECU 150 may determine if electronic stability control is already active. If electronic stability control is already active, second ECU 150 may exit the current control routine at step 604. For example, if electronic stability control system 140 is already controlling a vehicle during a skid, electronic stability control system 140 may be unable to facilitate controlling a vehicle during any power steering failures. If, however, electronic stability control is not active, second ECU 150 may proceed to step 606.

During step 606, second ECU 150 may store the current vehicle operating parameters. These parameters may include, but are not limited to: the current yaw rate, the current lateral G acceleration, the current wheel speeds, the current steering angle, vehicle speed, brake pedal position, as well as any other operating parameters. Next, second ECU 150 may proceed to step 608. During step 608, second ECU 150 may receive power steering system status information. This status information may include information about whether power steering system 102 is operating properly. In some cases, this information could be received over vehicle controller area network 190.

Next, during step 610, second ECU 150 may determine if power steering system 102 is failing. If not, second ECU 150 may proceed back to step 602. Otherwise, second ECU 150 may proceed to step 612. During step 612, second ECU 150 may start a timer. The duration of this timer may represent the duration of the transient state of the power steering system between the initial failure of the system and the moment at which a driver may fully recover control over the steering system in the absence of power steering assistance. In other words, the duration of the timer may be related to the brief period of time over which a driver may lose control of a vehicle due to a sudden failure of the power steering system. Following step 612, during step 614, second ECU 150 may increment the timer.

Next, during step 616, second ECU 150 may operate electronic stability control system 140 to maintain motor vehicle 100 on a corrected path that is substantially close to the driver intended path. Following this, during step 618, second ECU 150 may determine if the timer has expired by comparing the timer value to a maximum time. In other words, second ECU 150 may determine if motor vehicle 100 is still operating in the transient period immediately following power steering failure and before a driver has had time to fully regain steering control. If second ECU 150 determines that the timer is less than the maximum time, second ECU 150 may proceed back to step 612 to increment the timer. At this point, steps 614 through 618 may be repeated until the timer expires. This allows electronic stability control system 140 to continually control motor vehicle 100 on the corrected path until a driver has had time to regain control of motor vehicle 100. If, during step 618 second ECU 150 determines that the timer is greater than or equal to the maximum time, second ECU 150 may proceed to step 620 to exit the control program.

It will be understood that the current embodiment uses a timer that counts up to a maximum time. However, in other embodiments a timer can be used that counts down from a maximum time to zero. In still other cases, other methods of controlling an electronic stability control system for a predetermined amount of time can be used.

Figure 7:
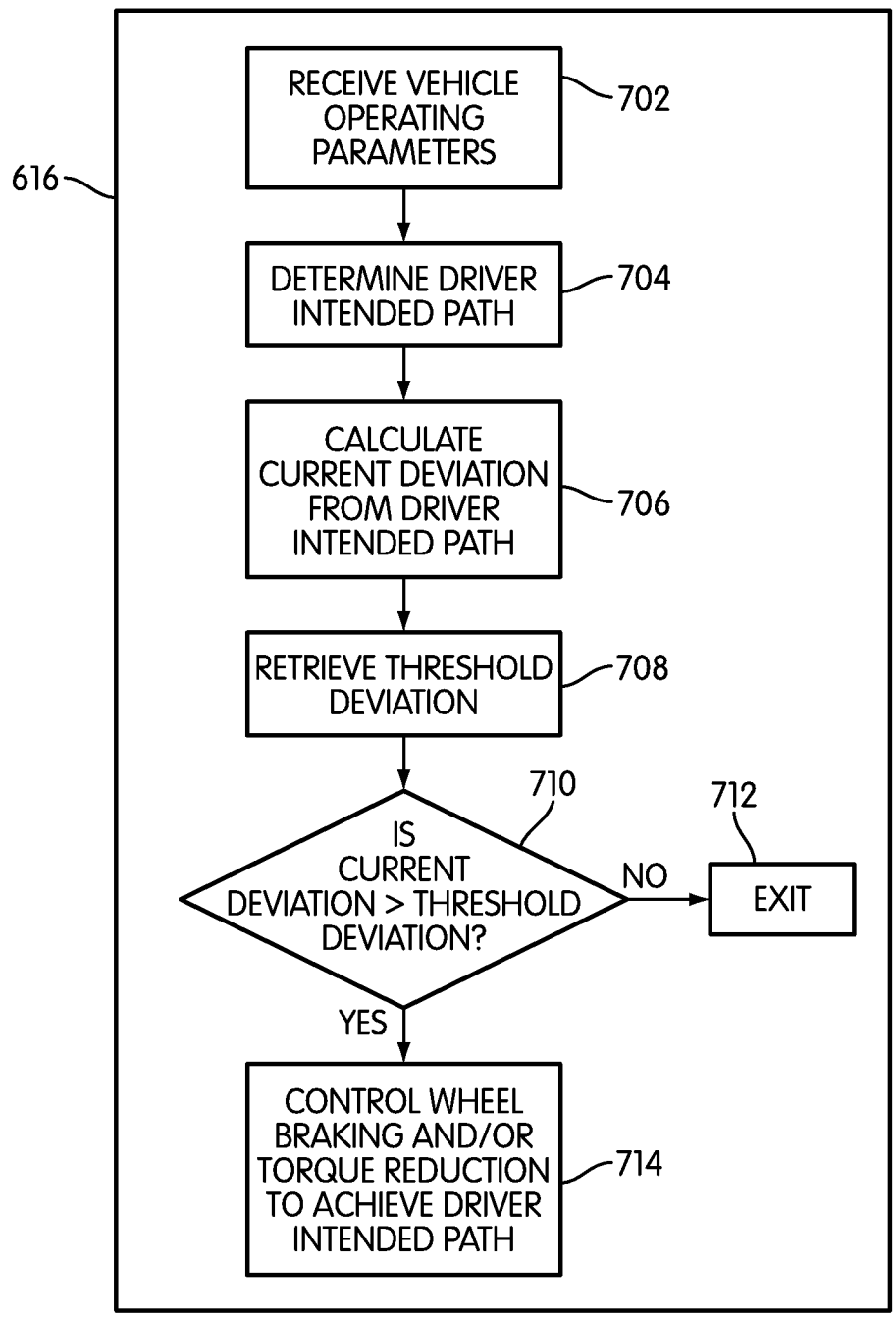
FIG. 7 is an embodiment of a process for controlling a motor vehicle during a power steering system failure.

FIG. 7 illustrates an embodiment of a process of operating an electronic stability control system to maintain a vehicle on or substantially near a driver intended path. In some embodiments, some of the following steps could be accomplished by electronic stability control system 140. Specifically, in some cases, some of the following steps could be accomplished by second ECU 150 of electronic stability control system 140. In other embodiments, some of the following steps could be accomplished by other components of motor vehicle 100. It will be understood that in other embodiments one or more of the following steps may be optional.

During step 702, second ECU 150 may receive vehicle operating parameters. These can include stored parameters as well as real-time parameters. These parameters may include, but are not limited to: the yaw rate, lateral G acceleration, wheel speeds, the steering angle, vehicle speed, brake pedal position, as well as any other operating parameters.

Next, during step 704, second ECU 150 may determine a driver intended path. In addition, in some cases, second ECU 150 may determine an uncorrected path and/or a current trajectory. In some cases, this step can be accomplished using path correction unit 500 (see FIG. 5). In other cases, any other program or algorithm can be used to determine the driver intended path and/or the uncorrected path. Following step 704, during step 706, second ECU 150 may calculate the current deviation of motor vehicle 100 from the driver intended path. In some cases, second ECU 150 may determine the current deviation of motor vehicle 100 from the driver intended path by comparing the uncorrected path with the driver intended path. In other cases, second ECU 150 may determine the current deviation of motor vehicle 100 from the driver intended path in any other manner.

Next, during step 708, second ECU 150 may retrieve a threshold deviation. Second ECU 150 may then proceed to step 710 to determine if the current deviation from the driver intended path is greater than the threshold deviation. If not, second ECU 150 may proceed to step 712. In this case, second ECU 150 may exit the program since there is not much difference between the current path and the driver intended path. In this case, no further action may be necessary. It will be understood, that in other embodiments, second ECU 150 could compare the current deviation and the threshold deviation in any other manner. For example, in another embodiment, second ECU 150 could check to see if the current deviation is less than the threshold deviation. In such an embodiment, second ECU 150 could proceed to step 712 when the current deviation is less than the threshold deviation and may proceed to step 714 otherwise.

If, during step 710, second ECU 150 determines that the current deviation is greater than the threshold deviation, second ECU 150 may proceed to step 714. During step 714, second ECU 150 may control wheel braking and/or reduce the engine torque in order to control motor vehicle 100 on a corrected path that approximates the driver intended path.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of operating a motor vehicle including a power steering system and an electronic control unit, the method comprising the steps of:
   receiving, at the electronic control unit, vehicle operating conditions;
   the electronic control unit determining that the power steering system of the motor vehicle is failing;
   the electronic control unit determining a driver intended path for the motor vehicle based on at least one of steering angle information, yaw rate information, lateral G information and wheel speed information;
   the electronic control unit calculating a current deviation from the driver intended path associated with a current trajectory of the motor vehicle;
   the electronic control unit retrieving a threshold deviation;
   the electronic control unit comparing the current deviation with the threshold deviation; and
   the electronic control unit controlling at least one brake of the motor vehicle to maintain the motor vehicle on a corrected path that is substantially closer to the driver intended path when the current deviation is substantially greater than the threshold deviation.

2. The method according to claim 1, wherein the driver intended path is a curved path.

3. The method according to claim 1, wherein the step of controlling at least one brake includes a step of controlling four brakes.

4. The method according to claim 1, wherein the step of determining the current deviation from the driver intended path includes a step of calculating an uncorrected path.

5. The method according to claim 1, wherein the step of controlling the at least one brake is followed by a step of reducing torque in an engine of the motor vehicle.

6. A method of operating a motor vehicle including a power steering system and an electronic control unit, the method comprising the steps of:
   receiving, at the electronic control unit, vehicle operating conditions;
   the electronic control unit determining that the power steering system of the motor vehicle is failing;
   the electronic control unit determining a driver intended path for the motor vehicle based on at least one of steering angle information, yaw rate information, lateral G information and wheel speed information;
   the electronic control unit calculating a current deviation from the driver intended path associated with a current trajectory of the motor vehicle;
   the electronic control unit retrieving a threshold deviation;
   the electronic control unit comparing the current deviation with the threshold deviation; and
   the electronic control unit operating an electronic stability control system to maintain the motor vehicle on a corrected path that is substantially closer to the driver intended path when the current deviation is substantially greater than the threshold deviation.

7. The method according to claim 6, wherein the electronic stability control system receives information from at least one of wheel speed sensors, a vehicle speed sensor, a yaw rate sensor and a lateral G acceleration sensor.

8. The method according to claim 6, wherein the step of operating the electronic stability control system to maintain the motor vehicle near the driver intended path includes controlling a braking system of the motor vehicle.

9. The method according to claim 6, wherein the motor vehicle has an engine, and the step of operating the electronic stability control system to maintain the motor vehicle near the driver intended path includes controlling the engine torque.

10. The method according to claim 6, wherein calculating the current deviation from the driver intended path comprises calculating the average distance between the current trajectory and the driver intended path.

11. A system for operating a motor vehicle including a power steering system, the system comprising:
    an electronic control unit configured to:
    receive vehicle operating conditions;

determine whether the power steering system of the motor vehicle is failing;

if the power steering system of the motor vehicle is failing, determine a driver intended path for the motor vehicle based on at least one of steering angle information, yaw rate information, lateral G information and wheel speed information;

calculate a current deviation from the driver intended path associated with a current trajectory of the motor vehicle;

retrieve a threshold deviation;

compare the current deviation with the threshold deviation; and apply substantially larger braking forces to a first set of brakes than to a second set of brakes to maintain the motor vehicle on a corrected path that is substantially closer to the driver intended path when the current deviation is substantially greater than the threshold deviation.

12. The system for operating a motor vehicle of claim 11, wherein the electronic control unit comprises at least one port for communicating with at least one of an acceleration sensor, a yaw rate sensor and a wheel speed sensor.

13. The system for operating a motor vehicle of claim 11, wherein the electronic control unit is configured to control engine torque.

14. The system for operating a motor vehicle of claim 11, wherein the motor vehicle comprises a vehicle controller area network that provides communication between the electronic control unit and a power steering system of the motor vehicle.

15. The system for operating a motor vehicle of claim 11, wherein the electronic control unit is configured to receive information from a steering angle sensor.

* * * * *